United States Patent [19]

Oppenländer et al.

[11] Patent Number: 5,919,275
[45] Date of Patent: Jul. 6, 1999

[54] FUEL AND LUBRICANT ADDITIVES, THEIR PREPARATION AND FUEL OR LUBRICANT COMPOSITIONS CONTAINING THESE ADDITIVES

[75] Inventors: Knut Oppenländer, Ludwigshafen; Jürgen Mohr; Hans-Joachim Müller, both of Grünstadt; Dietmar Posselt, Ludwigshafen; Wolfgang Günther, Mettenheim, all of Germany

[73] Assignee: BASF Aktiengesellschaft, Ludwigshafen, Germany

[21] Appl. No.: 08/722,205

[22] PCT Filed: Apr. 5, 1995

[86] PCT No.: PCT/EP95/01249

§ 371 Date: Oct. 15, 1996

§ 102(e) Date: Oct. 15, 1996

[87] PCT Pub. No.: WO95/27738

PCT Pub. Date: Oct. 19, 1995

[30] Foreign Application Priority Data

Apr. 12, 1994 [DE] Germany .............................. 44 12 489

[51] Int. Cl.$^6$ ................................. C10L 1/18; C10L 1/22; C08F 8/00

[52] U.S. Cl. ................................. 44/334; 44/383; 44/385; 44/418; 44/437; 44/447; 44/435; 44/384; 525/333.7; 525/333.9; 525/343; 525/375; 525/379; 525/385; 525/386

[58] Field of Search ............................. 508/250; 525/333, 525/333.7, 333.9, 343, 375, 379, 385, 386; 44/334, 383, 384, 385, 418, 437, 435, 447

[56] References Cited

U.S. PATENT DOCUMENTS 3,844,958  10/1974  Anderson ................................. 508/250

*Primary Examiner*—Jacqueline V. Howard
*Attorney, Agent, or Firm*—Oblon, Spivak, McClelland, Maier & Neustadt, P.C.

[57] ABSTRACT

Fuel or lubricant additives based on reaction products of an ethylenically unsaturated poly-1-alkene derived from one or more 1-alkenes of 3 to 24 carbon atoms and from 0 to 50% by weight of ethene, processes for their preparation and fuel or lubricant compositions containing these additives are described.

5 Claims, No Drawings

FUEL AND LUBRICANT ADDITIVES, THEIR PREPARATION AND FUEL OR LUBRICANT COMPOSITIONS CONTAINING THESE ADDITIVES

This application is a 371 PCT/EP 95/01249 filed Apr. 5, 1995.

BACKGROUND OF THE INVENTION

1. Field of the Invention

The present invention relates to fuel and lubricant additives based on long-chain hydrocarbon radicals having a polar terminal group, a halogen-free, one-stage process for the preparation of these additives, in which polar reactants are subjected to a free radical addition reaction at the double bond of a long-chain olefin, and fuel and lubricant compositions which contain these additives.

2. Discussion of the Background

Carburettors and intake systems of gasoline engines as well as injection systems for metering fuel in gasoline and diesel engines are increasingly being contaminated by impurities which are caused by dust particles from the air, uncombusted hydrocarbon residues from the combustion chamber and crank case vent gases passed into the carburettor.

These residues shift the air/fuel ratio during idling and in the lower part-load range so that the mixture becomes richer, the combustion becomes more incomplete and in turn the proportions of uncombusted or partly combusted hydrocarbons in the exhaust gas becomes larger and the gasoline consumption rises.

It is known that, in order to avoid these disadvantages, fuel additives are used for keeping valves and carburettors or injection systems clean (cf. for example: M. Rossenbeck in Katalysatoren, Tenside, Mineralöladditive, ed. J. Falbe and U. Hasserodt, page 223, G. Thieme Verlag, Stuttgart 1978).

Depending on the mode of action as well as on the preferred place of action of such detergent additives, a distinction is made today between two generations.

The first generation of additives was capable only of preventing the formation of deposits in the intake system but not of removing existing deposits, whereas the modern additives of the second generation can achieve both (keep-clean and clean-up effect), and can do so in particular because of their excellent heat stability in zones at relatively high temperature, ie. in the intake valves.

The molecular structural principle of these additives which act as detergents can be stated in general to be a linkage of polar structures with mostly high molecular weight, nonpolar or oleophilic radicals.

Members of the second generation of additives are often products based on polyisobutene in the nonpolar moiety. Here too, additives of the polyisobutylamine type are particularly noteworthy.

Such detergents are obtained, starting from polyisobutenes, essentially by two multistage synthesis processes.

The first involves chlorination of the polymeric parent structure, followed by nucleophilic substitution of the polymeric parent structure by amines or, preferably, ammonia. A disadvantage of this process, apart from the two-stage nature of the synthesis, is the use of chlorine which results in the occurrence of chlorine- or chloride-containing products, which is no longer desirable today.

In the second process, polyisobutylamines are obtained from polyisobutene by hydroformylation, followed by reductive amination, ie. once again a two-stage process which also requires an appropriate infrastructure.

Simple, one-stage, chlorine-free synthesis processes for detergents and dispersants or compounds which combine both property profiles, which can be carried out in standard apparatuses, are therefore of particular technical and economic interest.

GB-A-1,383,423 discloses a method for the preparation of alkylpolyamines which can be used as carburettor detergents. Here, an α-olefin of at least 15 carbon atoms is reacted with a polyamine in the presence of a free radical initiator. The α-olefins used are particularly preferably polyisobutylenes.

EP-B-0 342 792 describes a process for the preparation of a polybutene having a thioether function, in which an organic thiol is reacted with a liquid polybutene which has one carbon-carbon double bond per molecule and a number average molecular weight of from 200 to 10,000 under conditions in which free radicals are produced.

SUMMARY OF THE INVENTION

It is an object of the present invention to provide compounds which are suitable as fuel or lubricant additives and are obtainable by a one-stage chlorine-free synthesis which is not technically complicated.

We have found that this object is achieved by fuel or lubricant additives which are obtainable by reacting an ethylenically unsaturated poly-1-alkene, derived from one or more 1-alkenes of 3 to 24, preferably 3 to 10 and particularly preferably 3 to 6, carbon atoms and from 0 to 50% by weight of ethene, with a) a compound of the general formula I

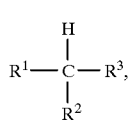

and/or b) a compound of the general formula II

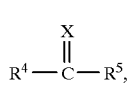

where

X is O or $NR^7$, $R^1$ is CN, COOH, C(O)OR$^9$, C(O)O(O)CR$^6$, CONR$^6$R$^7$, C(O)R$^9$, C(S)R$^9$, CHO, CH(NR$^6$R$^7$)R$^6$, SCR$^6$R$^7$R$^8$, NR$^7$R$^9$ or OR$^6$, $R^2$ and $R^3$ are identical or different and are each $R^1$, hydrogen or an organic radical differing therefrom, $R^4$ and $R^5$ are identical or different and are each hydrogen, OR$^9$, NR$^7$R$^8$ or an unsubstituted or substituted (cyclo)alkyl radical or aryl radical, $R^6$, $R^7$ and $R^8$ are identical or different and are each hydrogen or an organic radical and $R^9$ is an organic radical differing from hydrogen, and at least two of the radicals $R^1$ to $R^9$ may be part of a ring The present invention furthermore relates to a process for the preparation of these fuel or lubricant additives, in which a poly-1-alkene derived from one or more 1-alkenes of 3 to 24, preferably 3 to 10 and particularly preferably 3 to 6, carbon atoms and from 0 to 50% by weight of ethene is reacted in the presence of a free radical initiator under free radical-forming conditions with a) a compound of the general formula I and/or b) a compound of the general formula II, and to their use in fuel or lubricant compositions, in particular for internal combustion engines.

DETAILED DESCRIPTION OF THE PREFERRED EMBODIMENT

In a preferred embodiment of the invention, the ethylenically unsaturated poly-1-alkenes used are poly- or oligoolefins having a number average molecular weight of from 100 to 15,0000, obtained from one or more 1-alkenes of 3 to 24 carbon atoms and from 0 to 50% by weight of ethene. Particularly preferred amongst these are polyisobutenes having a number average molecular weight of from 150 to 5,000, in particular from 250 to 1,000, which are derived from isobutene and from 0 to 30% by weight of n-butene and are obtainable, for example, according to DE-A-27 02 604.

In a further preferred embodiment, poly-1-alkenes having a terminal double bond content of at least 95%, preferably at least 98%, are used, as obtained, for example, by polymerization or oligomerization of the monomer building blocks in the presence of a metallocene catalyst.

The poly-1-alkenes used according to the invention and derived from one or more 1-alkenes of 3 to 24 carbon atoms and from 0 to 50% by weight of ethene, preferably poly-1-n-alkenes, can be prepared, for example, by polymerizing 1-alkenes, preferably 1-n-alkenes, in the presence of a metallocene catalyst of the general formula III $$Cp_m MX_n Y_r \qquad \text{III,}$$

where Cp is an unsubstituted cyclopentadienyl unit and/or a mono-$C_1$–$C_4$-alkylcyclopentadienyl unit, m is a zirconium or hafnium atom and the ligands X are hydride and/or halogen ions and/or methyl, and in the presence of an organoaluminum compound, preferably an alumoxane, as a cocatalyst, the catalyst being used, relative to the alumoxane cocatalyst, in a ratio which corresponds to an M/Al atomic ratio of from 1:250 to 1:1000 and temperatures of from 50 to 110° C. and a pressure of from 30 to 100 bar being employed.

The catalysts III are zirconocenes and hafnocenes, including complexes of tetravalent zirconium and hafnium, in which the metal atom M is bonded in a sandwich-like manner between two unsubstituted and/or $C_1$–$C_4$-monoalkyl-substituted cyclopentadienyl groups Cp, the remaining valencies of the central atom M being saturated by hydride and/or halogen ions and/or by methyl groups. Zirconocene and hafnocene catalysts which are particularly preferably used in the novel process are those whose cyclopentadienyl groups are unsubstituted. Fluorine, chlorine, bromine and/or iodine ions may be bonded as halogen ions to the metal atom.

Examples of suitable catalysts are:

$Cp_2ZrF_2$, $Cp_2ZrCl_2$, $Cp_2ZrCl_2$, $Cp_2ZrI_2$, $Cp_2ZrCl$, $Cp_2Zr(CH_3)Cl$, $Cp_2Zr(CH_3)_2$, $Cp_2HfF_2$, $Cp_2HfCl_2$, $Cp_2HfBr_2$, $Cp_2HfI_2$, $Cp_2HfHCl$ $Cp_2Hf(CH_3)Cl$, $Cp_2Hf(CH_3)_2$.

Advantageously, only one catalyst is used in the oligomerization, but it is also possible to use mixtures of different catalysts. Preferred ligands X are chloride, hydride and methyl, and zirconium is particularly preferred as the central atom M for the catalysts III. Zirconocene chloride of the formula $Cp_2ZrCl_2$ whose cyclopentadienyl groups are unsubstituted is particularly preferably used as a catalyst.

The catalysts can be synthesized in a simple manner by known methods, for example according to Brauer (editor), Handbuch der Präparativen Anorganischen Chemie, Volume 2, 3rd edition, pages 1395 to 1397, Enke, Stuttgart 1978.

The cocatalysts used are organoaluminum compounds, preferably alumoxanes. Alumoxanes are formed in the partial hydrolysis of organoaluminum compounds, for example those of the general formulae $AlR_3$, $AlR_2Y$ and $Al_2R_3Y_3$, where R may be, for example, $C_1$–$C_{10}$-alkyl, preferably $C_1$–$C_5$-alkyl, $C_3$–$C_{10}$-cycloalkyl, $C_7$–$C_{12}$-aralkyl or alkaryl and/or phenyl or naphthyl and Y may be hydrogen, halogen or preferably chlorine or bromine, or $C_1$–$C_{10}$-alkoxy, preferably methoxy or ethoxy. The partial hydrolysis of such organoaluminum compounds can be carried out by various methods, for example by the method of DE-A-3 240 383 or by that in EP-A-0 268 214. The resulting oxygen-containing alumoxanes are in general not uniform compounds but oligomer mixtures of the general formula IV

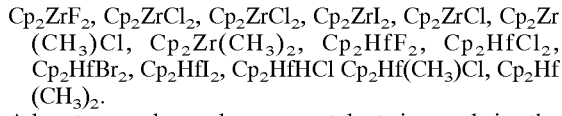

IV where as a rule n is from 6 to 20 and R has the abovementioned meanings. If organoaluminum compounds having different radicals R or mixtures of organoaluminum compounds having different radicals R are hydrolyzed, alumoxanes having different radicals R are formed and likewise be used as a cocatalyst. Advantageously, however, alumoxanes are used at cocatalysts. A preferred alumoxane is methylalumoxane. Since, owing to their method of preparation, the alumoxanes preferably used as cocatalysts are not uniform compounds, the molarity of alumoxane solutions is based below on their aluminum content.

For the polymerization, the catalyst is used relative to the cocatalyst in an amount which corresponds to an M/Al atomic ratio of in general from 1:250 to 1:1000, preferably from 1:300 to 1:600, in particular from 1:400 to 1:500.

The polymerization of the 1-alkene is advantageously carried out in the liquid phase, advantageously using small amounts of a solvent, preferably of an aliphatic or aromatic hydrocarbon, such as benzene, toluene, xylene, ethylbenzene, cumene, naphthalene, tetralin, hexane, heptane, octane, isooctane, nonane, decane, dodecane, cyclohexane, decalin, petroleum ether or naphtha Particularly preferably used solvents are toluene and xylene. In this process, solvent/1-alkene volume ratios of in general from 1:20 to 1:500, preferably from 1:30 to 1:200, particularly preferably from 1:40 to 1:100, are established, the volume of the 1-alkene being based on its volume at the pressure used in each case. Under the conditions used, the 1-alkene is liquid. The polymerization is carried out in general at from 50 to 110° C., particularly preferably from 60 to 90° C., and at from 30 to 100, preferably from 30 to 50, bar. The metallocene/1-alkene ratio is as a rule not critical for the process, but advantageously metallocene/1-alkene molar ratios of from 1:50 to 1:250,000, preferably from 1:70 to 1:200,000, in particular from 1:90 to 1:190,000, are used.

The polymerization may be carried out either batchwise, for example in stirred autoclaves, or continuously, for example in tubular reactors After the catalyst has been separated off by distillation of the products or by hydrolysis thereof and subsequent filtration of the precipitated solids, the reaction mixture is advantageously worked up by distillation, if desired at reduced pressure.

The propene preferably used as a raw material in this process may originate from a variety of sources, eg. from crack gases, for example from steam crackers. Propene as formed, for example, in propane dehydrogenation may also be used. Propene may be used in purified form, but it may also be used in mixtures with other hydrocarbons which are inert under the conditions of the reaction.

The polymerization process permits the selective preparation of poly-1-alkenes having terminal double bonds, in particular the selective preparation of propene polymers with high productivities.

The poly-1-alkenes used according to the invention, in particular the copolymers of ethene and 1-n-alkenes, can also be prepared by other known methods, as described, for example, in EP-A-0 441 548. Here too, a metallocene catalyst is used in combination with an aluminoxane. The metallocenes used here are likewise cyclopentadienyl-transition metal compounds of the formula III, preferred transition metals being Ti, Zr and Hf.

The poly-1-alkenes which can be prepared in this manner may subsequently be further reacted in a manner known per se in the novel process, if necessary after prior distillation.

For the preparation of the novel additives, the poly-1-alkenes are generally reacted at from 0 to 200° C. in the presence of a free radical initiator with the compounds of the general formula I and/or II.

These compounds have, at least at one point in the molecular skeleton, at least one hydrogen atom which is readily extractable with formation of a free radical intermediate, so that an addition reaction of these compounds takes place at the one or more ethylenic double bonds of the poly-1-alkene. According to the invention, preferred compounds of the formula I and/or II are those in which at least one of the substituents $R^4$ and $R^5$ and/or at least one of the substituents $R^6$ and $R^7$ is not hydrogen. Free radical initiators, the production of free radicals and free radical addition reactions with ethylenically unsaturated compounds are known per se. Such free radical addition reactions are described, for example, in the following publications:

H.-H. Vogel, Synthesis 1970, page 99 et seq.;
D. Elad, Chemistry and Industry 24 (1962), 362;
Friedmann, Lester, Tetrahedron Letters 1961, 238 et seq.;
Nikishin, Vinogradov, Fedorova, J.C.S. Chem. Commun. 1973, 693;
M. Regitz, B. Giese in Houben-Weyl, Methoden der Organischen Chemie, 4th edition, Vol. E 19a (1989).

The reaction conditions in the reaction of the novel poly-1-alkenes with the compounds of the formula I and/or II vary depending on the starting materials used and on the method for producing free radicals. However, the reaction temperature is in general from 0 to 200° C.

The reaction may be carried out in the absence of a solvent or with the use of inert solvents, for example aliphatic or aromatic hydrocarbons.

The molar ratio of poly-1-alkene to compounds of the formula I and/or II is as a rule from 1:1 to 1:30. Complete conversion of the ethylenic double bonds of the poly-1-alkene is, however, not necessary. Incomplete conversion may under certain circumstances even be advantageous.

The preparation of the novel additives is carried out, for example, by a method in which about two thirds of the compound of the formula I and/or II, possibly in a suitable solvent, are initially taken at the desired reaction temperature in a multineck flask advantageously equipped with a stirrer, an internal thermometer, a reflux condenser and a dropping funnel, and a mixture of poly-1-alkene, initiator and the remaining amount of the compound of the formula I and/or II, possibly with the use of an inert solvent, is then slowly added dropwise while stirring. After the end of the addition, the reaction mixture is, if required, further stirred at the selected temperature to complete the reaction. The course of the reaction can be monitored by IR spectroscopy with observation of the characteristic absorption band of the terminal double bond at about 890 $cm^{-1}$. After removal of the solvent and of the excess of the compound of the formula I and/or II, the reaction products are generally obtained in the form of a viscous, colorless to amber residue.

In fuel compositions, in particular for internal combustion engines, the novel additive is preferably used in an amount of from 10 to 5,000 ppm, in particular from 100 to 2,000 ppm.

In lubricant compositions, the novel additive is preferably used in an amount of from 0.5 to 10, in particular from 1 to 3, % by weight, based on the total weight of the composition.

As a result of their preparation, the additives used in the novel fuels or lubricants contain no halogen, which makes them particularly suitable for use in fuels or lubricants.

Owing to their structure, the novel additives can act both as dispersants and as detergents. This means that, as detergents, they keep valves and carburettors or injection systems clean. As dispersants, they also improve the dispersing of sludge in the engine oil after they have entered the lubricant circulation of the engine via the combustion chamber.

If it is intended primarily to make use of the dispersing properties of the novel additives, they may also be combined with conventional detergents as further additives.

Products which may be used as detergent components in the mixture with the novel substances as dispersants are in principle any known product suitable for this purpose, as described, for example, in J. Falbe, U. Hasserodt, Katalysatoren, Tenside und Mineralöladditive, G. Thieme Verlag, Stuttgart 1978, page 221 et seq., or in K. Owen, Gasoline and Diesel Fuel Additives, John Wiley & Sons, 1989, page 23 et seq.

N-containing detergents, for example compounds which contain an amino or amido group, are preferably used. Polyisobutylamines according to EP-A-0 244 616, ethylenediaminetetraacetamides and/or ethylenediaminetetraacetimides according to EP-A-0 188 786 or polyetheramines according to EP-A-0 244 725 are particularly suitable, reference being made to the definitions in these publications. As a result of their preparation, the products described there likewise have the advantage of being chlorine- and chloride-free.

If it is intended primarily to make use of the detergent action of the novel compounds, these substances may also be combined with carrier oils. Such carrier oils are known. Particularly suitable carrier oils are those based on polyglycol, for example corresponding ethers and/or esters, as described in U.S. Pat. No. 5,004,478 or DE-A-38 38 918. Polyoxyalkylene monools having terminal hydrocarbon groups (U.S. Pat. No. 4,877,416) or carrier oils as disclosed in DE-A-41 42 241 may also be used.

Leaded and in particular unleaded regular and premium graded gasolines are suitable as fuels for gasoline engines. The gasolines may also contain components other than hydrocarbons, for example alcohols, such as methanol, ethanol or tert-butanol, and ethers, eg. methyl tert-butyl ether. In addition to the novel additives, the fuels also contain, as a rule, further additives, such as corrosion inhibitors, stabilizers, antioxidants and/or further detergents.

Corrosion inhibitors are generally ammonium salts of organic carboxylic acids which, when the starting compounds have an appropriate structure, tend to form films.

Amines for reducing the pH are also frequently present in corrosion inhibitors. Heterocyclic aromatics are generally used for preventing corrosion of nonferrous metals.

EXAMPLES

1. Preparation of the Novel Additives

Example 1

290 g of morpholine were initially taken and heated to reflux temperature (about 130° C.) in a multineck flask equipped with a stirrer, an internal thermometer, a reflux condenser and a dropping funnel. A mixture of the initiator di-tert-butyl peroxide (5.3 g), 500 g of polyisobutene (number average molecular weight 1,000) and 145.8 g of morpholine was then slowly added dropwise. After the end of the dropwise addition, stirring was continued for a total of 12 hours at 130° C., a total of 5.3 g of di-tert-butyl peroxide being added a little at a time during this period. The reaction mixture was then freed from excess reagent.

Examples 2 to 7

The procedure was as in Example 1, but with the use of the amounts, stated in Table 1, of different compounds of the general formula I or II and initiator. Furthermore, the mixture was heated in each case to the temperature stated in Table 1 and this temperature was maintained during the reaction and the subsequent stirring.

TABLE 1

| Ex. No. | Olefin (mol) | Compounds I or II (mol) | Initiator (mol) | Temp. [° C.] |
|---|---|---|---|---|
| 1 | Polyisobutene (1) | Diethyl malonate (10) | 0.1 | 140 |
| 2 | Polyisobutene (1) | Isobutyraldehyde (2.5) | 0.25 | 160 |
| 3 | Polyisobutene (1) | Pyrrolidone (10) | 0.1 | 140 |
| 4 | Polyisobutene (1) | Morpholine (10) | 0.2 | 130 |
| 5 | Polyisobutene (1) | Dimethylformamide (5) | 0.5 | 145 |
| 6 | Polyisobutene (1) | Cyclopentanone (2.5) | 0.25 | 160 |
| 7 | Polyisobutene (1) | Allylamine (2.5) | 0.1 | 75 |

The action of the derivatives prepared as valve cleaners was tested in engine tests.

2. Engine Tests

The engine tests were carried out in a 1.2 1 Opel Kadett engine according to CEC F/04/A/87. Fuel used: European unleaded premium grade.

TABLE 2

| Additive from Example | Dose [ppm] | Intake valve deposits [mg]* | | | |
|---|---|---|---|---|---|
| | | Valves 1 | 2 | 3 | 4 |
| 1 | 800 | 11 (542) | 8 (441) | 8 (405) | 17 (623) |
| 2 | 800 | 10 (447) | 6 (262) | | |
| 3 | 800 | 2 (255) | 1 (155) | 2 (150) | 1 (395) |
| 4 | 800 | 0 (255) | 1 (155) | 0 (150) | 0 (395) |
| 5 | 800 | 2 (255) | 3 (155) | 2 (150) | 4 (395) |
| 6 | 800 | 0 (300) | 0 (168) | 2 (175) | 2 (355) |

TABLE 2-continued

| Additive from Example | Dose [ppm] | Intake valve deposits [mg]* | | | |
|---|---|---|---|---|---|
| | | Valves 1 | 2 | 3 | 4 |
| 7 | 800 | 12 (300) | 2 (300) | 6 (300) | 2 (355) |

*Values in brackets: Deposits without the introduction of additives; the different values are due to differences in the European unleaded premium grade used.

We claim:

1. A process for the preparation of a fuel additive, comprising reacting an ethylenically unsaturated poly-1-alkene derived from one or more 1-alkenes of 3 to 24 carbon atoms and from 0 to 50% by weight of ethylene in the presence of a free radical initiator under free radical-forming conditions with a) a compound of the formula I

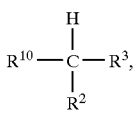

I or b) a compound of the formula II

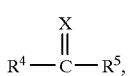

II where

X is O or $NR^7$, $R^{10}$ is CN, COOH, $C(O)R^9$, $C(O)O(O)CR^6$, $CONR^6R^7$, $C(O)R^9$, $C(S)R^9$, CHO, $CH(NR^6R^7)R^6$, $SCR^6R^7R^8$ or $OR^6$, $R^2$ and $R^3$ are identical or different and are each $R^1$, hydrogen or an organic radical differing therefrom, $R^4$ and $R^5$ are identical or different and are each hydrogen, $OR^9$, $NR^7R^8$ or an unsubstituted or substituted (cyclo)alkyl radical or aryl radical, $R^6$, $R^7$ and $R^8$ are identical or different and are each hydrogen or an organic radical and $R^9$ is an organic radical differing from hydrogen, and at least two of the radicals $R^1$ to $R^9$ may be part of a ring.

2. The process as claimed in claim 1, wherein the poly-1-alkene has a number average molecular weigh to from 150 to 5,000.

3. The process as claimed in claim 1, wherein at least one of the substituents $R^4$ sand $R^5$ is not hydrogen.

4. The process as claimed in claim 1, wherein at least one of the substituents $R^6$ and $R^7$ is not hydrogen.

5. The process as claimed in claim 1, wherein said ethylenically unsaturated poly-1-alkene is polyisobutene and said compound of formula I is morpholine.

* * * * *